United States Patent [19]

Beaupre

[11] Patent Number: 4,889,541

[45] Date of Patent: Dec. 26, 1989

[54] SEPARATION OF GASES

[75] Inventor: Richard F. Beaupre, Darien, Conn.

[73] Assignee: Texaco Inc., White Plains, N.Y.

[21] Appl. No.: 214,985

[22] Filed: Jul. 5, 1988

[51] Int. Cl.[4] .................... B01D 53/22; B01D 19/00
[52] U.S. Cl. ................................ 55/16; 55/68; 55/158; 55/189
[58] Field of Search ............ 55/16, 48, 68, 73, 158, 55/159, 189; 423/226, 228, 229

[56] References Cited

U.S. PATENT DOCUMENTS

| | | | |
|---|---|---|---|
| 2,966,235 | 12/1960 | Kammermeyer | 55/16 |
| 3,256,675 | 6/1966 | Robb | 55/16 |
| 3,325,330 | 6/1967 | Robb | 55/16 X |
| 3,510,387 | 5/1970 | Robb | 55/16 X |
| 3,650,808 | 3/1972 | Gagnon | 428/412 |
| 3,657,113 | 4/1972 | Stancell et al. | 55/16 X |
| 3,852,135 | 12/1974 | Cook et al. | 156/94 |
| 3,874,986 | 4/1975 | Browall et al. | 428/412 |
| 3,930,990 | 1/1976 | Brun et al. | 55/16 X |
| 3,980,456 | 9/1976 | Browall | 55/158 |
| 4,039,499 | 8/1977 | Steigelmann et al. | 55/16 X |
| 4,117,079 | 9/1978 | Bellows | 55/158 X |
| 4,132,824 | 1/1979 | Kimura et al. | 55/158 X |
| 4,311,594 | 1/1982 | Perry | 55/16 X |
| 4,484,935 | 11/1984 | Zampini | 55/158 |
| 4,493,716 | 1/1985 | Swick | 55/16 X |
| 4,729,773 | 3/1988 | Shirato et al. | 55/159 X |
| 4,750,918 | 6/1988 | Sirkar | 423/229 X |
| 4,775,519 | 10/1988 | Yitnieh | 423/229 X |

*Primary Examiner*—Robert Spitzer
*Attorney, Agent, or Firm*—Robert A. Kulason; James J. O'Loughlin; Carl G. Seutter

[57] ABSTRACT

A rich liquid containing carbon dioxide-in-methanol may be treated to separate carbon dioxide by use of a silicone or silicone-polycarbonate membrane.

9 Claims, No Drawings

SEPARATION OF GASES

FIELD OF THE INVENTION

This invention relates to the separation of gases. More particularly it relates to the use of membrane technology to separate carbon dioxide from a rich liquor containing methanol and carbon dioxide.

BACKGROUND OF THE INVENTION

As is well known to those skilled in the art, gases such as acid gases (typified by hydrogen sulfide, carbonyl sulfide, carbon dioxide etc) may be removed from gas streams in which they occur by a wide variety of absorption processes. In these processes, the gas stream is contacted in an absorber with a lean liquor, in which the gas is soluble; and the gas is separated from the liquor in a desorber or stripper. The regenerated solvent is then recycled to the absorber.

The solvents which may be employed include chemical solvents such as diethanolamine, N-methyldiethanolamine, or tropine or physical solvents such as methanol; pyrrolidone; tetrahydrothiophene-1,1-dioxide; polyethylene glycol dimethyl ether; etc.

One commonly used system is the Selexol process in which polyethylene glycol dimethyl ether is used to absorb hydrogen sulfide, carbon dioxide, carbonyl sulfide, etc. from gas streams. Another common system is the Rectisol process which may be used for example to recover carbon dioxide by absorption in methanol.

The rich pressurized liquid from the absorber, typically containing methanol and carbon dioxide, is commonly depressurized in a flash drum to separate gas; the flashed liquid may then be heated and passed to a stripper wherein additional gas is separated. The lean absorbent is then recycled to the absorber.

It is well known to those skilled in the art that the separation of gas from the rich liquid is costly both in terms of capital expense (requiring flash drums, distillation towers, and heat exchangers) and operating expense (due to cost of pumping, heating, condensing, etc).

It is an object of this invention to provide a process for separating gases. Other objects will be apparent to those skilled in the art.

STATEMENT OF THE INVENTION

In accordance with certain of its aspects, this invention is directed to a method of separating a gas from a rich charge liquid containing a gas which comprises;

maintaining in a desorption unit a separating layer membrane selected from the group consisting of (i) a membrane of cast polyvinyl alcohol which has been cross-linked with an aliphatic polyaldehyde containing at least three carbon atoms including those said aldehyde groups and (ii), a membrane of silicone or of silicone-polycarbonate said membrane having a high pressure charge side and a low pressure discharge side;

passing into contact with the high pressure charge side of said membrane a rich charge liquid containing a gas;

maintaining a pressure on the charge side of said membrane in excess of the pressure on the low pressure discharge side of said membrane, whereby at least a portion of said gas in said rich charge liquid passes through said membrane as permeate and said rich charge liquid is converted to a lean liquid retentate containing less gas than is present in said rich charge liquid;

recovering from the low pressure discharge side of said membrane said permeate gas; and recovering from the high pressure charge side of said membrane said lean liquid retentate containing less gas than is present in said rich charge liquid.

DESCRIPTION OF THE INVENTION

The charge stream admitted to the process of this invention may be a rich liquor - a liquid solvent which contains dissolved therein a gas. Although the solvent may be any liquid in which a selected gas is soluble, clearly the liquids which are particularly of interest include those which are used in commercial absorption systems. Among these may be noted (i) alcohols such as methanol, ethanol, isopropanol, n-propanol, butanols, pentanols, etc; (ii) carbonates such as ethylene carbonate, propylene carbonate, etc; (iii) nitrogen heterocycles such as N-methyl-2 pyrrolidone; (iv) glycol types such as polyethylene glycol dimethyl ether, etc; (v) amine types such as monoethanolamine, diethanolamine, N-methyl diethanolamine, etc; etc.

The gases which may be absorbed may include acid gases such as hydrogen sulfide, carbon dioxide, carbonyl sulfide, sulfur dioxide, sulfur trioxide, hydrogen cyanide, etc.

In the typical system with which the process of this invention finds use, the solvent may be methanol and the gas absorbed therein may contain carbon dioxide. An illustrative sour gas feed may contain (vol %) about 19.5 v% $CO_2$, 42.5 v % CO, 34 v % hydrogen, 1 v % $H_2S$, and small quantities of other gases including COS, $N_2$, Ar, $CH_4$, $NH_3$, and $H_2O$.

A typical rich liquid which has been used to absorb carbon dioxide gas by the Rectisol process (at 100-1000 psig, say 500 psig and minus 50° C. -25° C., say minus 30° C.) may contain methanol and gas, the latter being present in amount of 1 100 volumes, say 20 volumes (STP) per volume of methanol. Typically the gas in the rich liquid may contain 50-100v %, say 73 v % carbon dioxide–as might be the case when the absorbent is used to recover $CO_2$ from the gas generated in the Texaco Coal Gasification Process. In this later instance, the rich liquid may also contain CO and $H_2S$ in amounts of about 15% and 8% respectively and lesser quantities of other gases.

THE MEMBRANE

The composite membrane structure which may be used in practice of this invention includes a multi-layer assembly which in one embodiment may include a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In one embodiment, the carrier layer may be a porous, flexible, non-woven fibrous polyester.

A preferred non-woven polyester carrier layer may be formulated of non-woven, bonded strands and characterized by a fabric weight of 80±8 grams per square yard, a thickness of 4.2±0.5 mils, a tensile strength (in the machine direction) of 31 psi and (in cross direction) of 10 @0.5 inches of water.

THE POROUS SUPPORT LAYER

The porous support layer which may be used (on top of the carrier layer) in practice of this invention is preferably formed of a sheet of polysulfone polymer. Typically the polysulfone may be of thickness of 40–80 microns, say 50 microns and of molecular weight $\overline{M}_n$ of 5,000–100,000, preferably 20,000–60,000 say 40,000. The polysulfone is preferably characterized by a pore size of less than about 500 A and typically about 200 A. This corresponds to a molecular weight cut-off of less than about 25,000, typically about 20,000.

The sulfone polymers which may be employed may include those made from cumene, containing isopropylidene groups in the backbone; e.g.

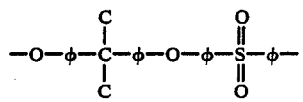

These isopropylidene sulfones containing repeating units including ether-aromatic-isopropylidene-aromatic-ether -aromatic-sulfone-aromatic groups may typically have a molecular weight $\overline{M}_n$ of 15,000–30,000, a water absorption (at 20° C.) of about 0.85 w % a glass transition temperature of 449° K., a density of 1.25 g/cm$^2$, a tensile strength (at 20° C.) at yield of 10,000 psi, and a coefficient of linear thermal expansion of $2.6 \times 10^{-5}$ mm/mm/°C.

It is found, however, that the preferred sulfone polymers which may be employed in practice of the process of this invention, may include those which are free of isopropylidene moieties in the backbone chain and wherein the phenylene groups in the backbone are bonded only to ether oxygen atoms and to sulfur atoms. One preferred polymer, which may typically, be prepared from

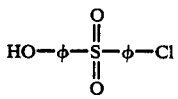

may be characterized by a backbone containing the following repeating groups:

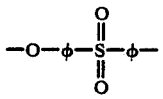

A preferred sulfone polymer may be a polyether sulfone which is free of isopropylidene moieties in the backbone chain and wherein the phenylene groups in the backbone are bonded only to ether-oxygen atoms and to sulfur atoms. This polymer may be characterized by molecular weight $\overline{M}_n$ of 25,000, water absorption @20° C. of 2.1 w %, glass transition temperature of 487° K., tensile strength at yield of 12,2000 psig at 20° C.; and coefficient of linear thermal expansion of $5.5 \times 10^{-5}$ mm/mm/°C. This polymer has a molecular weight cut off of about 20,000 and has a pore size of about 200 A.

When the charge contains a component which dissolves the polysulfone (as is the case, e.g. with ketones or esters), the preferred support layer may be a polyacrylonitrile.

It is a feature of the process of this invention that the preferred separating layers which may be employed are characterized by physical strength and characteristics such that it may not be necessary to utilize a carrier layer or a porous support layer. In one preferred embodiment, the system does not include a carrier layer and a porous support layer—merely a separating membrane.

THE SEPARATING LAYER

The non-porous barrier or separating layer which permits attainment of separation in accordance with practice of the process of this invention includes film or membrane of silicone or silicone-polycarbonate.

The separating membranes useful in the separation of this invention may include a membrane selected from the group consisting of (i) a cast polyvinyl alcohol membrane which has been cross-linked with an aliphatic polyaldehyde containing at least three carbon atoms including those in said aldehyde groups and (ii) a membrane formed of polymers having the following formula $$[R_2SiO]_a [R''O-CO-OR'']_b$$

wherein
R is hydrogen or a monovalent hydrocarbyl residue bonded to silicon;
R'' is a divalent hydrocarbylene residue;
a is a number greater than two; and
b is zero or a number greater than two.

It is apparent that when b is zero, the polymer may be a silicone, typically having the formula $$R'[R_2SiO]_a R'$$

wherein R' is a terminal group(s) which may be selected from the same group as that from which R is selected.

In the above compound, R may be hydrogen or a hydrocarbon group selected from the group consisting of alkyl, aralkyl, cycloalkyl, aryl, alkaryl, alkenyl, and alkynyl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 3-methoxypropyl, 2-ethoxyethyl, carboethoxymethyl, 4-methylcyclohexyl, p-propylphenyl, p-methylbenzyl, 3-butyl-5-methylphenyl, etc. The preferred R groups may be lower alkyl, i.e. $C_1$-$C_{10}$ alkyl, groups including eg methyl, ethyl, n-propyl, i-propyl, butyls, amyls, hexyls, octyls, decyls, etc. R may preferably be methyl.

Illustrative of the silicones which may be may be those of molecular weight $\overline{M}_n$ of 150–50,000, say 25,000. Commonly they may be compounds wherein a may be 2–600, say 300.

The preferred compounds may be those wherein R is methyl and R' is methyl. The most preferred of the silicones may be a trimethyl end-blocked dimethyl polysiloxane.

These silicones are readily available commercially as membranes typically of thickness of 1–300 microns, say 25 microns and of molecular weight $\overline{M}_n$ of 150–50,000, say 25,000.

Silicones which may be employed may include those of the following table, first listed being preferred.

TABLE

A. General Electric brand of trimethyl endblocked dimethyl polysiloxane membrane of thickness of 25 microns, of Sp. Gr. of 1.1–1.2 of tensile strength at 400 psi of 500–1800 psi, B. Petrarch Systems Inc PF 040 brand of trimethyl endblocked dimethyl polysiloxane membrane of molecular weight $\overline{M}_n$ of 3780, of thickness of about 25 microns, and Sp. Gr. of 0.96.

C. Petrarch Systems Inc. PF 043 brand of trimethyl endblocked dimethyl polysiloxane membrane of molecular weight $\overline{M}_n$ of 28,000, of thickness of about 25 microns, of Sp. Gr. of 0.971.

It is apparent that when b is other than zero in the above formula, the polymer may be a polymer having the formula

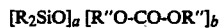

[R$_2$SiO]$_a$ [R"O-CO-OR"]$_b$

In this formula, R" may preferably be a hydrocarbon group selected from the group consisting of alkylene, aralkylene, cycloalkylene, arylene and alkarylene, including such radicals when inertly substituted. When R" is alkylene, it may typically be methylene, ethylene, n-propylene, iso-propylene, n-butylene, i-butylene, sec-butylene, amylene, octylene, decylene, octadecylene, etc. When R" is aralkylene, it may typically be benzylene, beta-phenylethylene, etc. When R" is cycloalkylene, it may typically be cyclohexylene, cycloheptylene, cyclooctylene, 2-methylcycloheptylene, 3-butylcyclohexylene, 3-methylcyclohexylene, etc. When R" is arylene, it may typically be phenylene, naphthylene, etc. When R" is alkarylene, it may typically be tolyene, xylylene, etc. R" may be inertly substituted i.e. it may bear a non-reactive substituent such as alkyl, aryl, cycloalkyl, ether, etc. Typically inertly substituted R" groups may include 3-methylbenzylene, 3-methyl-5-methylphenylene, etc. The preferred R" groups may be phenl or lower alkylene, i.e. C$_1$–C$_{10}$ alkylene, groups including eg methylene, ethylene, n-propylene, i-propylene, butylene, amylene, hexylene, octylene, decylene, etc. R" may preferably be phenylene or ethylene —CH$_2$CH$_2$—.

The silicone-polycarbonate polymer membrane which may be employed may be prepared by various techniques. For example it may be possible to form a useful product polymer by reacting an alpha, omega-dihydroxy silane (or more preferably a siloxane such as a polysiloxane) with carbonyl chloride COCl$_2$ (in the presence of hydrogen chloride acceptor such as aqueous caustic) to produce a product polymer containing silicone and polycarbonate residues.

In another embodiment, it may be possible to prepare a copolymer by adding to a reaction mixture (i) a cyclic dimethyl polysiloxane (such as octamethyl cyclotetrasiloxane) and (ii) a mixture of bisphenol A (i.e. 2,2-bis(4-hydroxy phenyl) propane and carbonyl chloride COCl$_2$. Reaction is carried out in solvent eg formamide in the presence of hydrogen chloride acceptor.

In still another embodiment it may be possible to prepare a prepolymer or an oligomer of a siloxane monomer (such as octamethyl cyclotetrasiloxane) by use of e.g. aqueous potassium hydroxide catalyst. To this reaction mixture may then be added either (i) a mixture of bisphenol A and carbonyl chloride or (ii) a prepolymer or oligomer of polycarbonate formed from bisphenol A and carbonyl chloride.

Although the polymer may be a copolymer of a silicone and a polycarbonate, it is preferred to utilize block copolymers of silicone and polycarbonate.

Clearly the copolymers may be prepared as by the reaction of silicones bearing terminal hydroxyl groups (i.e. wherein at least one R' on each terminal of the silicone is a hydroxyl group) with COCl$_2$. Alternatively a block polymer may be prepared by processes known to those skilled in the art—e.g. homopolymerization of silicone may be initiated and thereafter polymerization of polycarbonate may be initiated in the same reaction mixture. See U.S. Pat. No. 3,980,456 as well as patents referred to therein including U.S. Pat. No. 3,189,662 the texts of which are incorporated by reference herein.

These copolymers and/or block copolymers are available commercially from various suppliers including General Electric, Dow Corning, Petrarch etc. Illustrative commercially available block copolymers may include General Electric MEM-213 brand of silicone polycarbonate prepared by the reaction of phosgene with a siloxane prepolymer terminated by free phenolic hydroxyl groups (derived from bisphenol A i.e. 4,4-dihydroxydiphenyl propane)

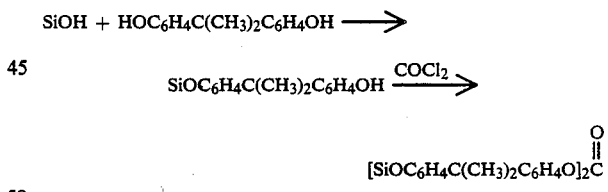

This polymer has a specific gravity of 1.0–1.1.

The preferred membranes which may be employed may be of thickness of 2–40 microns, say 25 microns.

In an alternative embodiment, the separating layer which permits attainment of the separating in accordance with this invention includes a non-porous film of cross-linked polyvinyl alcohol of thickness of about 1–10 microns, preferably 1–5 microns, say 1.5 microns. The layer is formed from polyvinyl alcohol which has been prepared by hydrolysis of polyvinyl acetate-typically 50–100% hydrolyzed, preferably 90–100%, say 100% hydrolyzed. The charge polyvinyl alcohol has a molecular weight of 20,000–200,000 say 115,000. Typically it may be employed as a 5–10w %, say 7w % aqueous solution. A commercially available product which may be employed is the Aldrich brand of 100% hydrolyzed polyvinyl alcohol of molecular weight of about 115,000 as a 7w % aqueous solution.

It is a feature of this embodiment of the invention that the membrane or sheet of cross-linked polyvinyl alcohol separating layer is formed in situ on the porous support layer. This is effected by use, as a cross-linking agent, of an aliphatic dialdehyde containing at least three carbon atoms. Preferably the aliphatic dialdehyde may contain 3-8 carbon atoms, most preferably 5 carbon atoms. Typical aliphatic dialdehydes which may be employed may include:

TABLE glutaraldehyde
2-hydroxyhexanedial - 1,6
malonic dialdehyde
succinic dialdehyde
hexanedial - 1,6

The preferred aliphatic dialdehyde is glutaraldehyde. Aldehydes falling outside the scope of this invention typified by formaldehyde, glyoxal, or succinic semialdehyde yield membranes which are characterized by unsatisfactory performance. Performance is judged by the ability of a membrane system to give a permeate containing a minimum quantity of liquid with as high a gas flux as possible. Compositions falling outside the scope of this invention may be characterized by unsatisfactory selectivity or unsatisfactory productivity or both.

In situ cross-linking may be carried out by casting 5-10 w %, say 7 w % aqueous solution of polyvinyl alcohol which contains the aliphatic dialdehyde cross-linking agent. The mole ratio of cross-linking agent to polyvinyl alcohol may be 0.05-0.30, say 0.2.

Cross-linking is carried out, in the presence of acid catalyst, preferably inorganic acid. Sulfuric acid is preferred. Hydrochloric acid is much less preferred because it yields membranes of poor selectivity, although the flux may be high.

It may be possible in one embodiment to cross-link the polyvinyl alcohol separating layer in one step by adding to the aqueous solution of polyvinyl alcohol and dialdehyde, the acid catalyst, preferably sulfuric acid, in mole ratio of acid to dialdehyde of 0.08-0.14, say 0.1.

In another embodiment, it may be possible to apply to the porous support layer, an aqueous solution of polyvinyl alcohol and dialdehyde. This may be dried at 40° C.-80° C., say 50° C. for 2-10 minutes, say 4 minutes to form a film. There may then be added onto the surface of this film a viscous solution containing 2-7 w %, say 3.5 w % of polyvinyl alcohol and having a mole ratio of sulfuric acid to dialdehyde of 0.08-0.14, preferably 0.1.

The composite membrane, whether prepared by the one-step or the two-step process may then be cured in an oven at 100° C.-200° C., say 125° C. for 1-30 minutes, say 2 minutes to yield a polyvinyl alcohol film having a thickness of 1-10 microns, say 3 microns.

THE COMPOSITE MEMBRANE

It is a feature of this invention in one embodiment that the composite membrane of this invention may comprise (i) an optional carrier layer, characterized by porosity and mechanical strength, for supporting a porous support layer and a separating layer, (ii) a polysulfone porous support layer of molecular weight of 5,000-100,000, of thickness of 10-80 microns, and of molecular weight $\overline{M}_n$ cut-off of 25,00-100,000 and (iii) as a non-porous separating layer in one embodiment polyvinyl alcohol of molecular weight of 20,000-200,000 which has been cross-linked with an aliphatic dialdehyde containing 3-8 carbon atoms.

The membranes of this invention may be utilized in various configurations. It is, for example, possible to utilize the composite in a plate-and-frame configuration in which separating layers may be mounted on the porous support layer with the carrier layer.

It is possible to utilize a spiral wound module (in the case of a supported membrane) which includes a non-porous separating layer membrane mounted on a porous support layer and a carrier layer, the assembly being typically folded and bonded or sealed along all the edges but an open edge-to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic foraminous net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit input prevents fluid from bypassing the operative membrane system and insures that fluid enters the membrane system principally at one end. The permeate passes from the feed channel, into contact with the separating layer and thence therethrough, into the permeate channel and thence therealong to and through the perforations in the conduit through which it is withdrawn as net permeate.

In the case of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn from the system. In this embodiment, it will be apparent that the system may not include a carrier layer.

In another embodiment, it is possible to utilize the system of this invention as a tubular or hollow fiber. In this embodiment, the porous support (e.g. polysulfone) layer may be extruded or spun as a fine tube with a wall thickness of typically 0.001-0.1 mm. The extruded tubes are passed through a bath of first reactant and second reactant which are interfacially polymerized and cured in situ on the tubes. A bundle of these tubes is secured (with an epoxy adhesive) at each end in a header; and the fibers are cut so that they are flush with the ends of the header. This tube bundle is mounted within a shell in a typical shell-and-tube assembly.

In operation, the charge liquid may be admitted to the tube side and passes through the inside of the tubes and exits as retentate. During passage through the tubes, permeate passes through the non-porous separating layer and permeate is collected in the shell side.

SEPARATION

It is a feature of the non-porous separating layer of this invention that it is found to be particularly effective when used in a separation process. During separation, a charge liquid containing a more permeable gas and a less permeable liquid component is maintained in contact with a non-porous separating layer; and a pressure drop is maintained across that layer. The gas in the charge liquid diffuses through the membrane. The gas permeate which passes through the membrane and exits as a gas may be recovered by condensing at low temperature or preferably may be withdrawn as gas. The discharge side of the membrane is maintained at a pressure which is greater than the vapor pressure of the permeate gas. Preferably, the permeate side of the membrane is maintained at a pressure of typically vacuum - 100 psi, say 15 psig. The charge side of the membrane may typically be at 100–1000 psig, say 500 psig. Separation may typically be carried out at the temperature absorption eg minus 30° C. for methanol or 27° C. for Selexol.

The permeate which passes through the membrane typically includes e.g. gas and a small proportion of the charge liquid. Typically, the permeate contains 90–99 w %, say up to 99 w % gas. Permeate is recovered in gas phase.

Separation may typically be carried out at a flux of 0.01–1.5, say about 1.0 kilograms per square meter per hour (kmh). Typically, the units may have a rejection (measured in terms of w % of e.g. methanol in the retentate during separation at 70° C. of a solution of carbon dioxide through a standard separating layer 3 microns thickness) of 90–99.9 w % methanol.

It will be apparent that variations in the ability to effect separation of gas from rich liquor may be observed depending on the particular membrane employed.

DESCRIPTION OF PREFERRED EMBODIMENTS

Practice of the process of this invention will be apparent to those skilled in the art from the following wherein, as elsewhere in this text, all parts are parts by weight unless otherwise specified.

EXAMPLE I

In this example which represents the best mode presently known of practicing this invention, the separating membrane is the General Electric MEM - 213 brand silicone polycarbonate membrane of 25 microns thickness, having a Sp. Gr. of 1.0–101, a Dielectric Constant (at 60 cps) of 1.83, and a Dielectric Strength of 7000 volts/mil.

This membrane has a formula with the following repeating unit:

This membrane is mounted in a pressure-tight membrane cell which includes an inlet for liquid-containing-gas and an outlet for retentate liquid and an outlet for permeate gas. In this embodiment, the charge liquid is methanol containing 22.9 w% carbon dioxide gas at absorber pressure of 400 psig and 9° F. which may be representative of a rich liquor recovered from a commercial Rectisol unit.

Charge liquid is admitted to the membrane cell wherein, at 480 psig and −9° F., it contacts the silicone polycarbonate membrane. The permeate is carbon dioxide (99% purity) which is substantially free of methanol. Retentate is substantially pure methanol substantially free of carbon dioxide. Flux is $9.7 \times 10^{-3}$ cc/sec-cm$^2$.

EXAMPLES II–XI

In this series of Examples, the procedure of Example I is followed except that the Absorber Pressure, the Cell Pressure, the Cell Temperature, and the Concentration (w %) of carbon dioxide gas in the methanol is varied. The Flux $\times 10^3$ is reported in cc/sec-cm$^2$.

TABLE

| EXAMPLE | Absorber Pressure psig | Cell pressure psig | Cell Temp °F. | Flux | w % gas in charge methanol |
|---|---|---|---|---|---|
| I | 400 | 480 | −9 | 9.7 | 22.9 |
| II | 365 | 480 | −13 | 8.1 | 23.4 |
| III | 375 | 480 | −3 | 8.9 | 19.9 |
| IV | 240 | 480 | −19 | 5.5 | 16.0 |
| V | 215 | 480 | −19 | 5.3 | 14.0 |
| VI | 70 | 130 | −30 | 4.1 | 4.0 |
| VII | 500 | 490 | 78 | 5.1 | 20.8 |
| VIII | 400 | 490 | 78 | 3.3 | 15.8 |
| IX | 350 | 490 | 78 | 2.5 | 12.7 |
| X | 80 | 490 | 81 | 1.6 | 2.4 |
| XI | 70 | 490 | 81 | 0.7 | 1.7 |

From the above, it is apparent that the system of this invention permits ready separation of carbon dioxide from solvent methanol. It is particularly to be noted that the system gives good results at very low temperatures which are those which may be encountered in practice i.e. in the Rectisol process. It is thus possible to attain economies resulting from the fact that gas separation may be attained at low temperature—i.e. without the need to heat up the rich liquor as is commonly done in prior stripping processes.

EXAMPLES XII–XV

In this series of Examples, the procedure of Examples I–XI is carried out except that the gas dissolved in the methanol is hydrogen sulfide.

TABLE

| Example | Absorber Pressure psig | Cell Pressure psig | Cell Temp °F. | Flux | W % Gas in charge methanol |
|---|---|---|---|---|---|
| XII | 100 | 480 | 78 | 12.2 | 16.5 |
| XIII | 95 | 480 | 78 | 6.4 | 14.9 |
| XIV | 85 | 480 | 78 | 4.2 | 12.2 |
| XV | 75 | 480 | 77 | 4.1 | 11.5 |

From the above Table, it is apparent that desorption of hydrogen sulfide may be effected by use of the process of this invention.

EXAMPLES XVI–XXIII

In this series of Examples, the procedure of Examples I–XV is followed except that the membrane employed is a trimethyl endblocked dimethyl polysiloxane membrane. This silicone is characterized by a thickness of 25 microns, a Sp. Gr. of 1.1–1.2.

This membrane has the formula

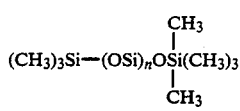

In Examples XVI–XXVII, the gas is carbon dioxide. In Example XXIX–XXXIII, the gas is hydrogen sulfide.

TABLE

| Example | Absorber Pressure psig | Cell Pressure psig | Cell Temp °F. | Flux | W % gas in charge methanol |
|---|---|---|---|---|---|
| XVI | 400 | 490 | 78 | 20.0 | 13.0 |
| XVII | 350 | 490 | 78 | 17.0 | 10.9 |
| XVIII | 160 | 490 | 78 | 4.8 | 4.2 |
| XIX | 100 | 500 | 82 | 2.7 | 2.9 |
| XX | 85 | 500 | 82 | 1.9 | 2.2 |
| XXI | 60 | 500 | 82 | 1.3 | 1.8 |
| XXII | 40 | 500 | 80 | 0.3 | — |
| XXIII | 500 | 500 | −7 | 23.2 | — |
| XXIV | 470 | 500 | −7 | 21.1 | — |
| XXV | 440 | 500 | −7 | 7.6 | 21.3 |
| XXVI | 330 | 500 | −6 | 5.5 | — |
| XXVII | 320 | 500 | 2 | 7.8 | — |
| XXVIII | 210 | 500 | 3 | 3.7 | 9.5 |
| XXIX | 90 | 320 | 76 | 2.8 | |
| XXX | 85 | 320 | 78 | 2.6 | 13.1 |
| XXXI | 75 | 300 | 78 | 2.3 | 10.6 |
| XXXII | 60 | 300 | 78 | 1.7 | 8.0 |
| XXXIII | 55 | 320 | 76 | 1.1 | 7.6 |

Results comparable to the above may be attained by use of the cross-linked polyvinyl alcohol separating membrane.

Although this invention has been illustrated by reference to specific embodiments, it will be apparent to those skilled in the art that various and modifications may be made which clearly fall within the scope of this invention.

I claim:

1. The method of separating a gas from a rich charge liquid containing an acid gas which comprises maintaining in a description unit a separating layer membrane selected from the group consisting of (i) a membrane of cast vinyl alcohol which has been cross-linked with an aliphatic polyaldehyde containing at least three carbon atoms including those in said aldehyde groups and (ii) a membrane of silicone or of silicone-polycarbonate said membrane having a high pressure charge side and a low pressure discharge side;

passing into contact with the high pressure charge side of said membrane a rich charge liquid containing gas;

maintaining a pressure on the charge side of said membrane in excess of the pressure on the low pressure discharge side of said membrane, whereby at least a portion of said gas in said rich charge liquid passes through said membrane as permeate and said rich charge liquid is converted to a lean liquid retentate containing less gas than is present in said rich charge liquid;

recovering from the low pressure discharge side of said membrane said permeate gas; and recovering from the high pressure charge side of said membrane said lean liquid retentate containing less gas than is present in said rich charge liquid.

2. The process for separating a gas from a gas-liquid charge as claimed in claim 1 wherein said gas-liquid charge contains carbon dioxide.

3. The process for separating a gas from a gas-liquid charge as claimed in claim 1 wherein said gas-liquid charge contains an alcohol.

4. The process for separating a gas from a gas-liquid charge as claimed in claim 1 wherein said gas-liquid charge contains methanol.

5. The process for separating a gas from a gas-liquid charge as claimed in claim 1 wherein said gas-liquid charge contains carbon dioxide and methanol.

6. The process for separating a gas from a gas-liquid charge as claimed in claim 1 wherein said membrane is a silicone $R'[R_2 SiO]_a R'$ wherein and R and R', are hydrogen or a monovalent hydrocarbyl residues and a is a number greater than two.

7. The process for separating a gas from a gas-liquid charge as claimed in claim 1 wherein said membrane is a trimethyl endblocked dimethyl polysiloxane.

8. The process for separating a gas from a gas-liquid charge as claimed in claim 1 wherein said membrane is a silicone-polycarbonate containing the moiety $[R_2SiO]_a[R''O\text{-}CO\text{-}OR'']_b$ wherein R is hydrogen or a hydrocarbyl moiety, R'' is a hydrocarbylene moiety, a is a number greater than two, and b is zero or a number greater than two.

9. The method of separating carbon dioxide from a rich charge liquid containing methanol and carbon dioxide which comprises maintaining, in a desorption unit as a separating layer membrane, a membrane of silicone or silicone polycarbonate, said membrane having a high pressure charge side and a low pressure discharge side;

passing into contact with the high pressure charge side of said membrane a rich charge liquid containing methanol and carbon dioxide;

maintaining a pressure on the high pressure charge side of said membrane in excess of the pressure on the low pressure discharge side of said membrane, whereby at least a portion of said carbon dioxide in said rich charge liquid passes through sad membrane as permeate gas and said rich charge liquid is converted to a lean liquid retentate containing less carbon dioxide than is present in said rich charge liquid;

recovering from the low pressure discharge side of said membrane said carbon dioxide permeate gas; and recovering from the high pressure charge side of said membrane said lean liquid retentate containing less carbon dioxide than is present in said rich charge liquid.

* * * * *

UNITED STATES PATENT AND TRADEMARK OFFICE
CERTIFICATE OF CORRECTION

PATENT NO. : 4,889,541
DATED : December 26, 1989
INVENTOR(S) : Richard F. BEAUPRE It is certified that error appears in the above-identified patent and that said Letters Patent is hereby corrected as shown below:

```
Col 11, line 44, cancel "description", insert -- desorption --; line 55 before "gas", insert -- an acid--.
```

Signed and Sealed this

Twenty-second Day of October, 1991

Attest:

HARRY F. MANBECK, JR.

*Attesting Officer*     *Commissioner of Patents and Trademarks*